United States Patent Office 3,006,591
Patented Oct. 31, 1961

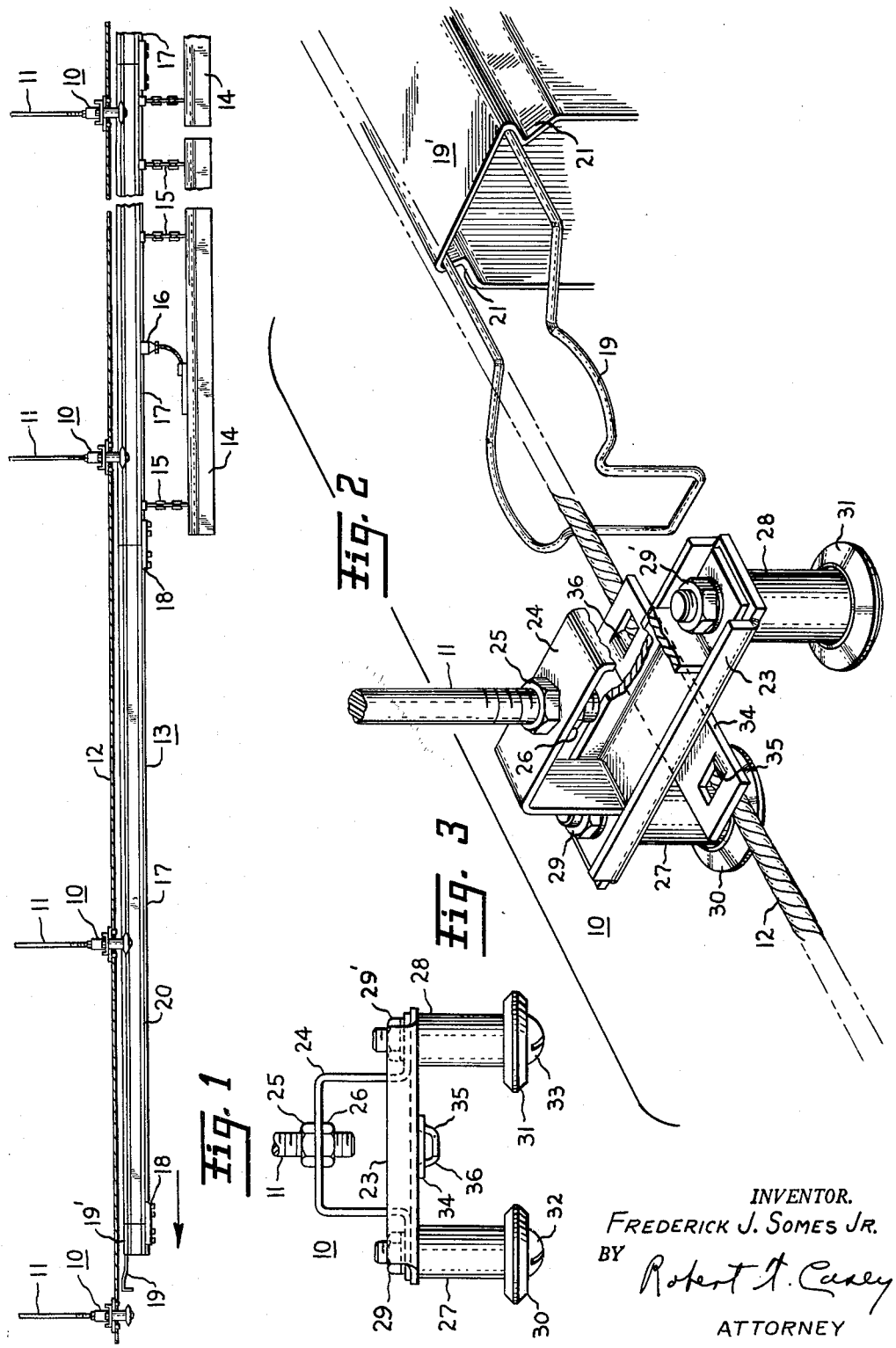

3,006,591
HANGER FOR ELECTRICAL DISTRIBUTION SYSTEM
Frederick J. Somes, Jr., Grosse Point Shores, Mich., assignor to General Electric Company, a corporation of New York
Filed Oct. 13, 1959, Ser. No. 846,153
2 Claims. (Cl. 248—317)

My invention relates to electrical distribution systems of the overhead-suspended type, and particularly to such electrical distribution systems which are adapted to be installed by the "roll-in" installation method. A system of this type is set forth, for example, in my prior application Serial No. 643,977, filed March 5, 1957, now Patent No. 2,931,097, April 5, 1960, assigned to the same assignee as the present invention.

Busway distribution systems of the type adapted for "roll-in" installation, include a plurality of longitudinally spaced hangers, each provided with a pair of rollers. The electrical conductors are housed in an elongated housing having longitudinal track portions adapted to interengage with the rollers of the hangers. The housing with its conductors may therefore be installed from a single location by connecting lengths of the housing together in end-to-end relation and projecting them outwardly along the desired path of installation. The leading end of the duct picks up and engages the rollers of each of the busway hangers in succession. In order to restrain the hangers from longitudinal movement in the direction of movement of the busway during such installation, a bracing or "sway" cable is provided which interconnects each of the suspended roller hangers, being attached to the suspending rods adjacent the hanger itself. While this structure serves to effectively prevent movement of the hangers in the direction of the installation of the busway, and permits installation of the duct by the roll-in method, difficulties are sometimes encountered because of twisting of the hangers on the supporting rods. This causes the rollers of the hangers to become misaligned with relation to the track portions of the leading end of the busway duct and it is necessary that they be straightened before the process can be continued. In addition, the process of attaching the cables to the suspending rods is relatively difficult.

It is an object of the present invention to provide an electrical distribution system which may be installed by the roll-in method, in which the aforesaid difficulties are avoided.

In accordance with the invention, an electrical distribution system is provided comprising a plurality of longitudinally spaced hangers each having a pair of spaced roller guide members and an intermediate bridging head portion, the intermediate head portion having a pair of clamping members for receiving a cable to attach the guide member to the cable, and means for attaching the hanger member to a suspension rod.

The invention will be more clearly understood from the following detailed description, taken in conjunction with the accompanying drawings, and its scope will be pointed out in the appended claims.

In the drawings:

FIGURE 1 is a side elevation view of an electrical distribution system in accordance with the invention, shown in the process of installation;

FIGURE 2 is a fragmentary view in perspective of a portion of the electrical distribution system of FIGURE 1;

FIGURE 3 is a front elevation view of the roller hanger portion of the system of FIGURE 1.

Referring to the drawing, the invention is shown as incorporated in an electrical distribution system comprising a plurality of longitudinally spaced hangers 10, each attached to the end of a suspending rod 11 and being interconnected by a bracing or "sway" cable 12, which is rigidly attached by suitable means, not shown, at its ends to a stationary portion of the building in which the installation is made.

The system further includes an electric power busway 13, having a plurality of electric power consuming devices such as lighting fixtures 14 suspended therefrom by means of chains 15 and connected to the busway electrically by means of a connector 16. The busway 13 comprises a plurality of longitudinal sections 17 which are connected in end-to-end relation by suitable connector means 18. The leading or end section is provided at its leading end with a lead-in adapter 19 adapted to facilitate the interengagement of the busway 13 with the hangers 10. Each of the sections 17 comprises a generally rectangular sheet metal duct or housing 20 having a pair of longitudinally extending parallel track portions 21 for engaging the rollers of the hangers 10. The busway 13 is adapted to be installed by longitudinal movement in the direction indicated by the arrow in FIGURE 1, picking up and engaging successive hangers 10 as it moves. The installation may therefore readily and expeditiously be accomplished from a single working location.

For the purpose of guiding the busway 13 during installation as well as for permanently supporting it in position during use, supporting assemblies are provided as referred to above each comprising a suspending rod 11 and a hanger assembly 10. The hanger assembly 10 is shown particularly in FIGURES 2 and 3. Each hanger assembly 10 comprises a main transversely extending supporting plate 23 having its edges bent upwardly to provide a channel shape for increased strength. The plate 23 has an inverted generally U-shaped attaching bracket 24 attached thereto, which bracket is in turn attached to the end of the rod 11 by suitable means such as by nuts 25 and 26.

The hanger assembly 10 further includes a pair of downwardly extending generally cylindrical supporting posts 27 and 28 each having their upper ends reduced in diameter and threaded and extending through holes in the plate 23 and the bracket 24 and being clamped thereto by means of nuts 29 and 29', thereby holding the parts referred to in assembled relation. A pair of horizontally disposed rollers 30 and 31 are attached to the lower ends of the supporting posts 27 and 28 and retained thereon by means of screws 32 and 33. A secondary plate 34 is rigidly attached to the main transverse supporting plate 23 by suitable means such as by welding. The plate 34 has a pair of integral lugs 35 and 36 struck out from the opposite end portions thereof.

In installation, the suspending rods 11 are installed first and the hanger assemblies 10 are attached to the lower ends of the rods 11 and adjusted to provide a suitable uniform height. The bracing or "sway" cable is then installed along the desired line of the distribution system and extending between the supporting posts 27 and 28 of each of the hangers 10, the opposite ends of the cable 12 being securely attached to a stationary portion of the building or other location and drawn taut. The cable 12 is placed under the lugs 35 and 36, the hanger assembly 10 being rotated about the rod 11 to permit this. The lugs 35 and 36 are then clamped to the plate 34 by a suitable tool such as pliers, securely attaching the cable 12 to the plate 34. The lead-in head 19 includes a short, generally tubular housing portion 19' corresponding in outline to the outline of the duct housing and rigidly attached thereto by a duct connector 18. The outer portion of the lead-in head 19 comprises a formed wire member and includes an upwardly bent portion to facilitate entry of the lead-in head between the posts 27 and 28 despite minor vertical variations in the position of the leading end of the busway.

Since plate 34 is securely attached to the cable 12 at two spaced points, and since the plate 34 is also rigidly attached, such as by welding, to the main transverse plate 23, the hanger assembly 10 is maintained in a position at all times in which the supporting posts 27 and 28 are on a line extending at right angles to the direction of the cable 12 as it passes through the hanger 10. This greatly facilitates the insertion of the busway duct end, especially when the busway is installed by the push-in method without the benefit of a guiding or lead-in cable.

Since many modifications of the invention may be made, I therefore intend by the appended claims to cover all such modifications as fall within the true spirit and scope of the invention.

What I claim as new and desire to secure by Letters Patent of the United States is:

1. For use with an electric power distribution system adapted to be installed by the roll-in method, hanger means comprising a generally planar plate member, a pair of spaced downwardly extending supporting posts rigidly attached to said plate member, a pair of guide rollers carried by the said supporting posts at the outer ends thereof respectively, said plate member having a pair of spaced apart integral lug portions adapted to receive a cable therein, and means for attaching said hanger means to the end of a suspending rod.

2. For use with an electric power distribution system adapted to be installed by the roll-in method, hanger means comprising a generally planar plate member, a pair of downwardly extending spaced-apart supporting posts rigidly attached to said plate member, a pair of guide rollers carried by the said supporting posts at the outer ends thereof respectively, a pair of clamping members carried by said plate member in spaced-apart relation between said supporting posts for clamping a guide cable to said plate member, said clamping members being aligned in a direction extending generally perpendicular to a reference line drawn between the points of attachment of said supporting posts on said plate member, and means for attaching said hanger member to the end of a suspending rod.

References Cited in the file of this patent

UNITED STATES PATENTS 2,299,607    Averbach _____ Oct. 20, 1942

FOREIGN PATENTS 1,160,023    France _____ Feb. 24, 1958